Nov. 22, 1949          P. A. SCHMIDT          2,489,108
REEL FOR WIRE WINDING MACHINES AND THE LIKE
Filed Jan. 30, 1947
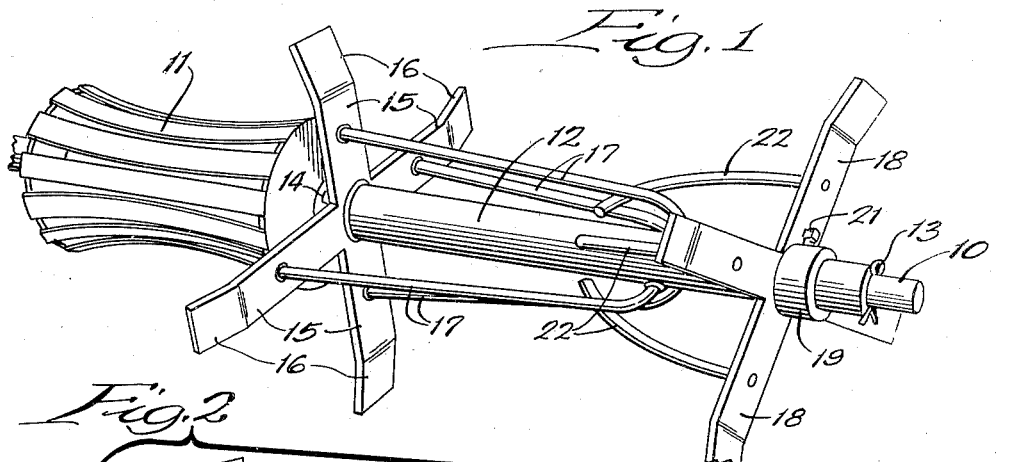
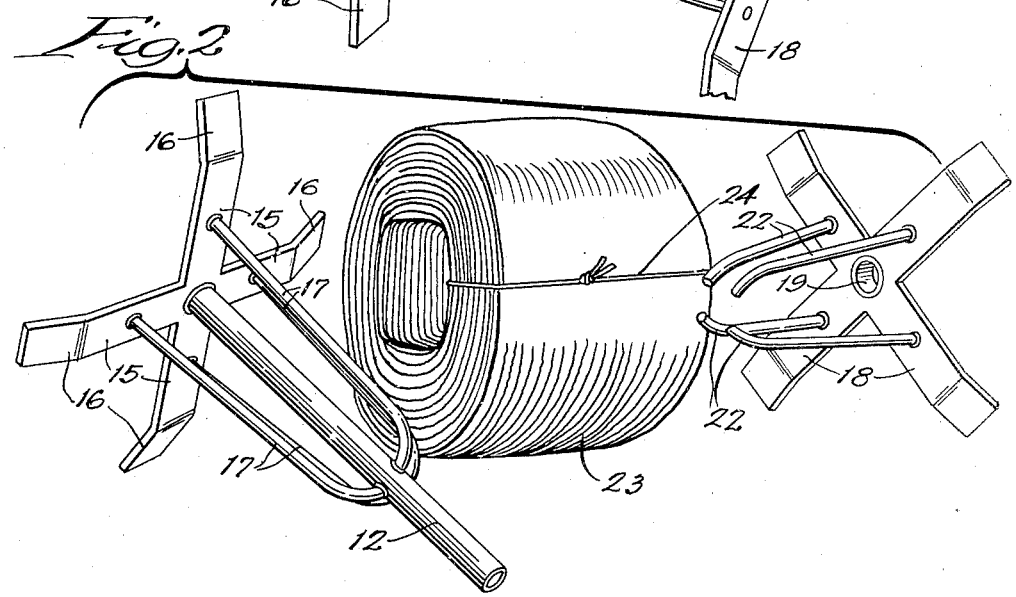
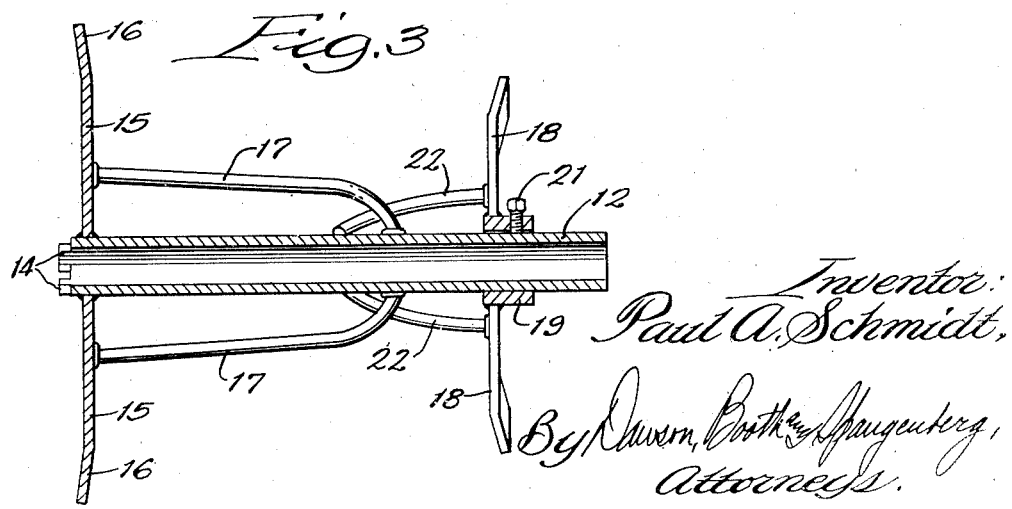

Patented Nov. 22, 1949

2,489,108

UNITED STATES PATENT OFFICE 2,489,108

REEL FOR WIRE-WINDING MACHINES AND THE LIKE

Paul A. Schmidt, Earlville, Ill.

Application January 30, 1947, Serial No. 725,188

5 Claims. (Cl. 242—77)

This invention relates to reels for wire winding machines and the like and more particularly to reels for winding and unwinding strands of wire and similar material.

It is one of the objects of the invention to provide a reel which can easily be assembled and disassembled for removal of a spool of wire therefrom or for mounting a spool of wire thereon.

Another object is to provide a reel in which the center of a spool of wire wound thereon is open to permit easy binding of the wire.

A further object is to provide a reel which is light in weight and simple and inexpensive to manufacture.

The above and other objects and advantages of the invention will be more readily apparent from the following description when read in connection with the accompanying drawing, in which—

Figure 1 is a perspective view illustrating a reel embodying the invention mounted on a wire winding machine;

Figure 2 is a view illustrating the reel disassembled and showing a spool of wire as wound on the reel; and Figure 3 is an axial sectional view through the assembled reel.

The reel of the present invention may be used with any desired type of winding or unwinding machines for strands of wire or like material and is particularly adapted for use with a wire winding machine as described and claimed in my copending application Serial No. 716,507, filed December 16, 1946. As partially shown in Figure 1, this machine comprises a supporting shaft 10 on which a driving roller 11 is rotatably mounted to be driven by engagement with a wheel. The free end of the shaft 10 projects beyond the driving roller to receive the reel.

The reel of the present invention comprises a central supporting tube 12 adapted to fit rotatably over the shaft 10 and to be held thereon by a cotter pin or the like 13. At one end the tube 12 is formed with clutch teeth 14 to engage complementary clutch teeth on the driving roller 11 so that the reel will be driven by the roller as the roller turns. Adjacent to the clutch teeth the tube 12 carries a fixed end member which is shown as formed of crossed strips 15 which may be welded together and welded to the tube. The main portion of the strips lies in a common plane transverse to the tube axis and the ends may be bent outwardly as indicated at 16 to facilitate picking up the wire during winding.

The strips carry rods 17 spaced circumferentially around the tube 12 and extending toward the outer end of the tube. The rods 17 preferably slope inward slightly toward the tube throughout their length and may be turned inward sharply at their outer ends and secured to the tube by welding or the like.

The reel is completed by a second end member similarly formed of cross strips 18 welded or otherwise permanently secured together and bent outwardly at their ends to facilitate picking up the wire. The strips 18 are carried by a hub 19 which can slip over the tube 12 and can be detachably secured thereon by a set screw 21 or other desirable fastening means.

The strips 18 carry inwardly projecting rods 22 which slope radially inward toward the tube 12. When the end member is secured on the tube, it may be turned to such a position that the rods 22 will interfit with the rods 17 and will overlap the outer ends of the rods 17 in an axial direction.

In winding a spool or strand of wire on the reel, the reel may be assembled as shown in Figures 1 and 3, and one end of the strand may be hooked over one of the rods 17 or 22. As the reel is turned, the wire will be wound thereon to form a spool as indicated at 23 in Figure 2. It will be noted that the wire is supported during the winding solely by the rods 17 and 22 so that it forms a spool whose center is hollow. With the wire still on the reel a binding as indicated at 24 which may be a short length of wire may be slipped through the hollow center of the spool between the supporting rods and may be fastened by twisting or clipping its ends to hold the wire in the spool. At this time the spool can be disassembled simply by releasing the set screw 21 and slipping the outer end member off of the tube so that the spool of wire can easily be removed from the rods 17 for storage. Due to the fact that the rods taper inward toward the center portion of the spool, the end members can easily be removed from the spool of wire. Thus the same reel can be utilized to wind any desired amount of wire which can easily be stored in the form of separate spools.

For unwinding a previously wound spool of wire, the spool can first be slipped over the rods 17 after which the outer end member may be mounted on the tube 12 to hold the wire in place. When the binding 24 is removed, the wire can easily be unwound from the reel.

While one embodiment of the invention has been shown and described herein, it will be understood that this is illustrative only and is not to

What is claimed is:

1. A reel for wire winding machines and the like comprising a pair of flat end members in parallel spaced relationship adapted to be rotatably supported on an axis extending centrally through the members, and inwardly extending spaced rods carried by the members and sloping inward toward the axis with the inner ends of the respective rods overlapping between the members.

2. A reel for wire winding machines and the like comprising a pair of flat end members in parallel spaced relationship adapted to be rotatably supported on an axis extending centrally through the members, inwardly extending spaced rods carried by the members and sloping inward toward the axis with the inner ends of the respective rods overlapping between the members, and means for detachably securing the members in parallel spaced relationship.

3. A reel for wire winding machines and the like comprising an elongated supporting tube, a pair of flat end members supported on the tube adjacent its ends respectively, and inwardly extending spaced rods carried by each of the members sloping inward toward the tube with their inner ends overlapping.

4. A reel for wire winding machines and the like comprising an elongated supporting tube, a pair of flat end members supported on the tube adjacent its ends respectively, and inwardly extending spaced rods carried by each of the members sloping inward toward the tube with their inner ends overlapping, one of the end members being rigidly secured to the tube and the other end member being detachably mounted on the tube.

5. A reel for wire winding machines and the like comprising an elongated supporting tube, an end member secured to the tube adjacent one end thereof and lying transverse to the tube axis, spaced supporting rods connected to the end member extending along and secured to the tube adjacent the other end thereof, a second end member fitting detachably on the other end of the tube, and spaced rods carried by the second end member to interfit with and axially overlap the end portions of the first named rods.

PAUL A. SCHMIDT.

REFERENCES CITED

The following references are of record in the file of this patent:

UNITED STATES PATENTS

| Number | Name | Date |
|---|---|---|
| 2,127,772 | Horn et al. | Aug. 23, 1938 |

FOREIGN PATENTS

| Number | Country | Date |
|---|---|---|
| 204,486 | Great Britain | Oct. 4, 1923 |